(12) United States Patent
Kyomoto et al.

(10) Patent No.: US 8,795,841 B2
(45) Date of Patent: *Aug. 5, 2014

(54) GRAFT POLYMERIZATION METHOD AND PRODUCT OBTAINED THEREBY

(75) Inventors: Masayuki Kyomoto, Osaka (JP); Kazuhiko Ishihara, Tokyo (JP)

(73) Assignees: Japan Medical Materials Corporation, Osaka (JP); The University of Tokyo, Tokyo (JP)

( * ) Notice: Subject to any disclaimer, the term of this patent is extended or adjusted under 35 U.S.C. 154(b) by 319 days.

This patent is subject to a terminal disclaimer.

(21) Appl. No.: 13/130,125

(22) PCT Filed: Nov. 20, 2009

(86) PCT No.: PCT/JP2009/069734
§ 371 (c)(1),
(2), (4) Date: Jul. 26, 2011

(87) PCT Pub. No.: WO2010/058848
PCT Pub. Date: May 27, 2010

(65) Prior Publication Data
US 2011/0274940 A1 Nov. 10, 2011

(30) Foreign Application Priority Data

Nov. 21, 2008 (JP) .................. 2008-298267

(51) Int. Cl.
 *B32B 27/00* (2006.01)
 *F16C 33/20* (2006.01)
 *C08J 3/28* (2006.01)

(52) U.S. Cl.
 USPC ..... 428/500; 508/100; 623/23.58; 623/23.59; 525/471; 522/99; 522/111; 522/134; 522/136; 522/139; 522/143; 522/144; 522/146

(58) Field of Classification Search
 None
 See application file for complete search history.

(56) References Cited

U.S. PATENT DOCUMENTS

| | | |
|---|---|---|
| 2004/0243249 A1 | 12/2004 | Ishihara et al. |
| 2009/0306781 A1 | 12/2009 | Kyomoto et al. |
| 2009/0325027 A1* | 12/2009 | Maekawa et al. ............... 429/33 |
| 2010/0024951 A1 | 2/2010 | Takahashi |

FOREIGN PATENT DOCUMENTS

| | | |
|---|---|---|
| GB | 2 454 140 | 4/2009 |
| JP | 54-63025 | 5/1979 |
| JP | 6-122779 | 5/1994 |
| JP | 2003-310649 | 11/2003 |
| JP | 2007-202965 | 8/2007 |
| JP | 2008-53041 | 3/2008 |
| JP | 2008-226833 | 9/2008 |

OTHER PUBLICATIONS

Supplementary European Search Report issued in Application No. 09827629.8.
C. Qiu et al., "Nanofiltration Membrane Prepared from Cardo Polyetherketone Ultrafiltration Membrane by UV-Induced Grafting Method", Journal of Membrane Science, vol. 255, pp. 107-115, 2005.
M. Kyomoto et al., "Self-Initiated Surface Grating with Poly(2-Methacryloyloxyethyl Phosphorylcholine) on Poly(Ether-Ether-Ketone)", Biomaterials, vol. 31, pp. 1017-1024, 2010.
English translation of the International Preliminary Report on Patentability and Written Opinion dated Jul. 5, 2011.
International Search Report issued Dec. 28, 2009 in International (PCT) Application No. PCT/JP2009/069734.
M. Kyomoto et al., "Self-Initiated Surface Grafting with Poly(2-Methacryloyloxyethyl Phosphorylcholine) on Poly(ether-ether-ketone)", Biomaterials xxx, pp. 1-8, 2009.
M. Kyomoto et al., "Self-Initiated Surface Graft Polymerization of 2-Methacryloyloxyethyl Phosphorylcholine on Poly(ether ether ketone) by Photoirradiation", ACS Applied Materials & Interfaces, vol. 1, No. 3, pp. 537-542, 2009.

* cited by examiner

*Primary Examiner* — Sheeba Ahmed
(74) *Attorney, Agent, or Firm* — Wenderoth, Lind & Ponack, L.L.P.

(57) ABSTRACT

Disclosed is a graft polymerization method which has solved problems involved in use of a solvent, a radical initiator and high-energy radiation when a monomer is graft-polymerized on the surface of a polymer base. The graft polymerization method is characterized in that a polymerization product is obtained by immersing a polymer base (i) having a ketone group on the surface into a reaction system containing a monomer (ii) and then irradiating the polymer base (i) with light so that polymerization of the monomer starts from the surface of the polymer base (i).

12 Claims, 2 Drawing Sheets

FT-IR analysis

XPS analysis (spectra)

Static water contact angle measurement

GRAFT POLYMERIZATION METHOD AND PRODUCT OBTAINED THEREBY

This application is a U.S. national stage of International Application No. PCT/JP2009/069734 filed Nov. 20, 2009.

TECHNICAL FIELD

The present invention relates to a surface-initiated graft polymerization method, so-called "grafting from" method. In addition, the present invention also relates to various products produced by using the above-mentioned surface-initiated graft polymerization method.

BACKGROUND OF THE INVENTION

Surface treatment techniques, which provide various excellent functions on a surface to be treated of a substrate, by performing a surface treatment on the surface of the substrate, are a technology which attracts attentions. Although there are various methods for surface treatment, the method of performing surface treatment comprising using graft polymerization accompanied by a covalent bond by photo-polymerization is widely used in recent years in broad fields, such as plastic molded product materials, plastic film materials, optical lens materials, medical materials, and magnetic materials.

This type of graft polymerization can be classified broadly into two major categories; (1) a surface-initiated graft polymerization, so-called a "grafting from" method and (2) a graft polymerization using the adsorption of the polymers (dip coating, crosslinking, binding by the reactive functional group in the polymers), so-called a "grafting to" method. In order to provide various excellent functions on a surface which was treated by graft polymerization by using monomers having various functions, the "grafting from" method which is the surface-initiated type graft polymerization is an effective method.

As one method of performing graft polymerization, a photo-graft polymerization method, wherein the graft polymerization reaction is initiated by irradiation of a light (electromagnetic wave) having a predetermined wavelength, is continuing to progress along with the development of a photo-polymerization initiator and the improvement of an irradiation apparatus to be used. The applications of the photo-graft polymerization method are expected to have a new progress in the future in the fields such as an information industry, an automobile/precision instruments industry, and a medical industry.

Conventionally, as the photo-polymerization initiator of the photo-graft polymerization, a photo-radical initiator is mainly used. It is necessary to apply a radical initiator beforehand to the surface to be treated (for example, the surface of a substrate which is to be treated) for performing the "grafting from" method.

In one example of the conventional photo-graft polymerization method, a film or layer of 2-methacryloyloxyethyl phosphorylcholine (MPC) polymer is formed by graft polymerizing MPC onto the surface of a substrate by using polyethylene (PE) as the substrate, MPC as a reactive monomer, and benzophenone (BP) as a photo-polymerization initiator (Patent Documents 1 and 2).

Alternatively, it is proposed that a simultaneous irradiation method which comprises irradiating simultaneously a substrate and a monomer with radiation for the graft polymerization, or a prior irradiation method comprising irradiating the substrate with a gamma ray, followed by contacting the substrate with the monomer, thereby performing a graft polymerization (Patent Document 3).

[Patent Document 1] JP-A-2003-310649
[Patent Document 2] JP-A-2007-202965
[Patent Document 3] JP-A-2008-53041

The method of Patent Document 1 is shown by the following scheme 1:

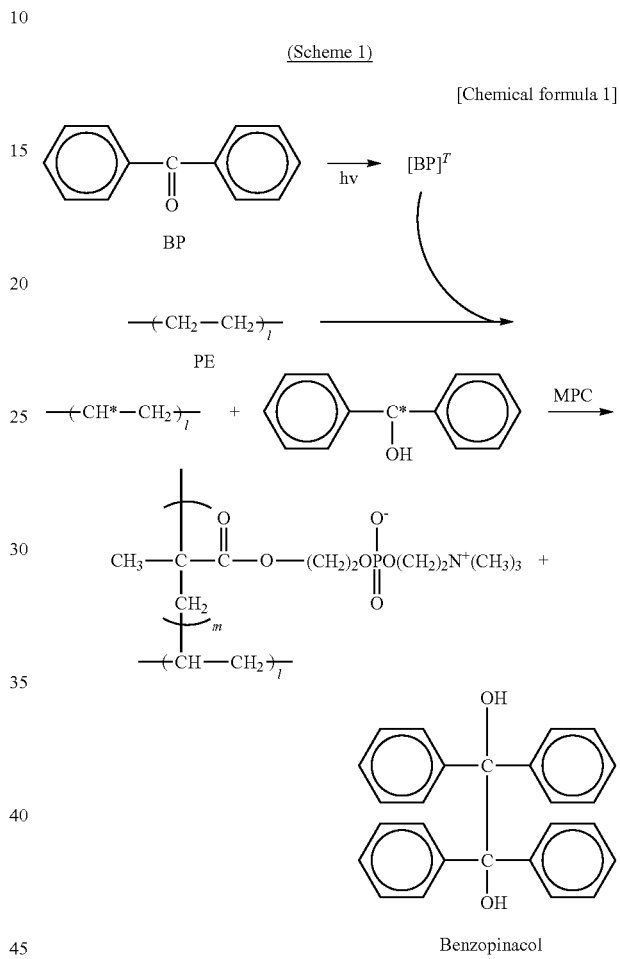

In the method of the above-mentioned Patent Document 1, in order to uniformly work the radical initiator as the polymerization initiator onto the surface of the substrate and to uniformly coat the given surface of the substrate with the polymerization product, it is necessary to dissolve a radical initiator in a solvent and then to apply the radical initiator solution to the surface of the substrate. However, there was a problem that the solvent exerts unintended functions, such as erosion or dissolution action on the surface of the substrate to be treated, depending on types of the solvent.

Further, in order to realize the surface-initiated graft polymerization, it is necessary to select such a solvent that the monomers are soluble in the solvent, while the radical initiator is insoluble or hardly-soluble in the solvent, as the property of the solvent to be used for the photo-graft polymerization. Therefore, there was the problem that the options are limited.

The MPC copolymer produced by the method of Patent Document 1 is useful as the material for forming an ideal biocompatible surface. However, in the case where the product therefrom is used as a biocompatible material, it is desirable that no radical initiator remains on the surface of the substrate and in the graft polymer layer after performing the graft polymerization reaction. Therefore, in the method shown in the above Scheme 1, there was another problem of removing the radical initiator that remains after performing the graft polymerization reaction from the surface of the substrate and the graft polymer layer.

The method shown by Patent Document 3 uses high energy radiations, for example, gamma rays, electron beams (beta rays), ion beam, and X-rays in order to form a free radical. These radiations themselves have so high risks that large-scale facilities are further required for controlling the radiation source, therefore there are problems with respect to safety and economical efficiency.

According to the simultaneous irradiation method proposed by Patent Document 3 as the specific method of graft polymerization, a sufficient graft density (for example, at least 0.01 chains/nm$^2$) is not obtained by the graft polymerization, since the free radicals are generated from both of the substrate and the monomer. In addition, there were the problems that unnecessary or undesirable molecular cleavage is caused, since the radiation such as gamma rays can pass through the substrate, thereby giving deterioration or embrittlement of the substrate. The graft density is described, for example, in "New Frontiers in Polymer Synthesis" Advances in Polymer Science, Vol. 217, 2008.

According to the pre-irradiating method, when the period of time, after irradiation until the substrate on which the free radicals being generated is contacted with the monomers, is elongated, the available free radical decreases with passage of time, thereby it is capable of failing to obtain a desirable and sufficient graft rate (density). The problem of deterioration (or embrittlement) of the substrate accompanied by irradiating with radiation, such as gamma rays still remains, as in the case of simultaneous irradiation method.

DISCLOSURE OF THE INVENTION

Problems to be Solved by the Invention

Objects of the present invention are to simultaneously dissolve the problems including:
a problem of erosion or dissolution action of the surface of the substrate caused by a solvent, which is accompanied by the use of the solvent;
a problem that it is required to remove the radical initiator that remains after performing the graft polymerization reaction from the polymerized system, which is accompanied by the use of a radical initiator;
a problem of troublesome handling thereof with respect to the safety and the economical efficiency;
a problem of insufficient graft rate (density); and
a problem of capable of causing deterioration (or embrittlement) of the substrate, which are accompanied by use of high energy radiations.

Means for Solving the Problems

The present application provides an invention relating to a method of surface-initiated graft polymerization comprising:
immersing a polymer substrate (i) which has a ketone group on the surface of the substrate in a reaction system containing a monomer (ii); and
irradiating the polymer substrate (i) with light, thereby initiating a polymerization reaction of the monomer from the surface of the polymer substrate (i) to give a polymerization product.

The present application provides an invention relating to a polymerization product which is coated on the surface of the polymer substrate (i), which is produced by the above-mentioned surface-initiated graft polymerization method.

The present application provides an invention relating to a polymer substrate (i) having at least part of the surface of the polymer substrate which is coated with a layer of the polymerization product produced according to the above-mentioned surface-initiated graft polymerization method.

The present application provides an invention relating to a method of coating at least part of the surface of the polymer substrate with the polymerization product of the monomer (ii) by using the above-mentioned surface-initiated graft polymerization method.

The present application provides an invention relating to a method of producing the polymer substrate (i) having a surface, wherein at least part of the surface is coated with the polymerization product of monomer (ii) by using the above-mentioned surface-initiated graft polymerization method.

Effects of the Invention

According to the present invention, there is provided a method of graft polymerization which simultaneously dissolves the problem accompanied by the use of a solvent;
the problem accompanied by the use of a radical initiator; and
the problems accompanied by use of high energy radiations when the monomers are graft polymerized onto a desired surface of the polymer substrate.

According to the present invention, there is provided a polymerization product which coats the surface of a polymer substrate, which has the desired functions and properties (such as an insulation property, a barrier property, durability, a load support property, and a deformation resistance property), wherein the polymerization product is capable of showing the desired function and properties (such as high proton conductivity, a fuel shutoff property, an electrolytic property, high hydrophilicity and lubricity, a protein adsorption inhibition property, a cell adhesion inhibition property, a soil adhesion inhibition property, an adhesive property with an adhesive or paint, water resistance, and heat resistance).

According to the present invention, there is provided a polymer substrate having the desired functions and properties (such as an insulation property, a barrier property, durability, a load support property, and deformation resistance), which is coated with a layer of a polymerization product having the desired functions and properties (such as high proton conductivity, a fuel shutoff property, an electrolytic property, high hydrophilicity and lubricity, a protein adsorption inhibition property, a cell adhesion inhibition property, a soil adhesion inhibition property, an adhesive property with an adhesive or paint, water resistance, and heat resistance).

According to the present invention, there is provided a method of coating a given surface of a polymer substrate, which shows the desired functions and properties (such as an insulation property, a barrier property, durability, a load support property, and deformation resistance), with a polymerization product having the desired functions and properties (such as high proton conductivity, a fuel shutoff property, an electrolytic property, high hydrophilicity and lubricity, protein adsorption inhibition property, a cell adhesion inhibition property, a soil adhesion inhibition property, an adhesive property with an adhesive or paint, water resistance, and heat resistance).

According to the present invention, there is provided a method of producing a polymer substrate, which shows the desired function and properties (such as an insulation property, a barrier property, durability, a load support property, and deformation resistance), and at least part of which is coated with a polymerization product having the desired function and properties (such as high proton conductivity, a fuel shutoff property, an electrolytic property, high hydrophilicity and lubricity, a protein adsorption inhibition property, a cell adhesion inhibition property, a soil adhesion inhibition property, an adhesive property with an adhesive or paint, water resistance, and heat resistance).

MODE FOR CARRYING OUT THE INVENTION

Figure 1:
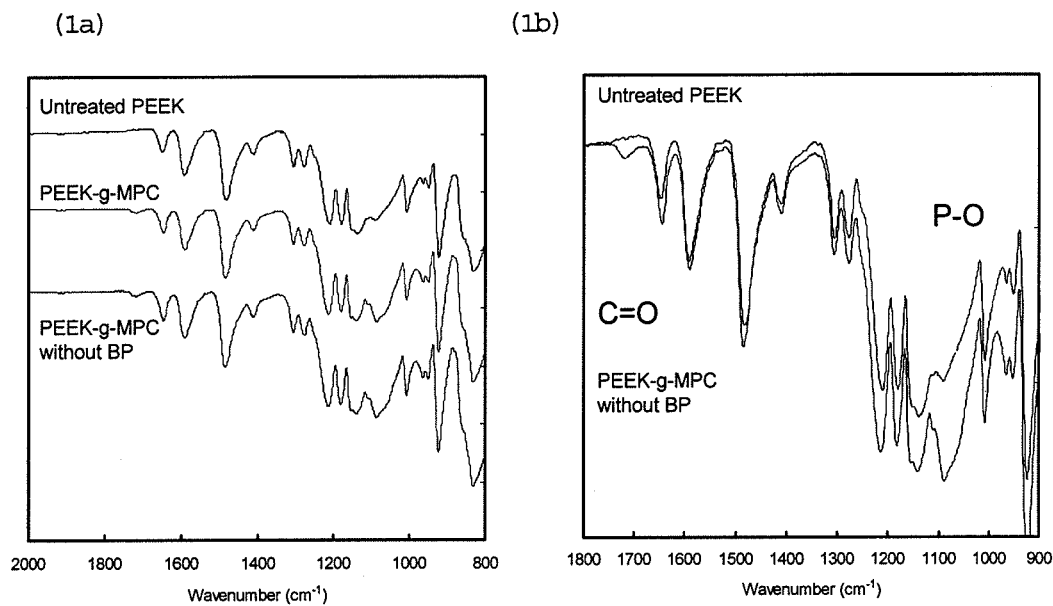
FIG. 1 shows the results of the Fourier transform infrared spectroscopy (FT-IR) of the products of Example 1 and Comparative Example 2, each of which are compared with an un-treated PEEK substrate.

The graft polymerization method used in the present invention is basically characterized in that the surface of the polymer substrate (i) having a ketone group on the surface of the substrate is used as a reaction field, wherein a reaction system including the monomer (ii) is made to exist on the surface of the polymer substrate (i). The present graft polymerization method is also characterized in that the method uses no polymerization initiator, especially no photo-polymerization initiator, for example, no photo radical type initiator. The polymer substrate is irradiated with light, thereby performing the surface-initiated graft polymerization in which the polymerization of the monomer is initiated from the surface of the polymer substrate (i), to give the desired polymerization product.

The solvent may be or may not be used, depending on the combination of the polymer substrate (i) and the monomer (ii). However, in order to cause a radical reaction to occur uniformly in the whole reaction system, it is preferable to disperse or dissolve the radical monomer (ii) in a suitable solvent. The reaction system in such a case includes the solvent in which the monomer (ii) is dispersed or dissolved. It is preferable to use a suitable solvent for the above-mentioned graft polymerization reaction system. A polymerization product (branch polymer) is formed on the substrate (trunk) by the graft polymerization, wherein a covalent bond exists between the substrate and the polymerization product.

In the present graft polymerization method, a substrate having an aromatic ketone can be used as the polymer substrate (i) having a ketone group on the surface of the substrate. In the substrate having the aromatic ketone, it is preferable that an aromatic group (for example, a benzene ring) and a ketone group are contained in the main chain of the polymer. Examples of the substrate having the aromatic ketone include polymer materials selected from the group consisting of polyether ketone (PEK), polyether ether ketone (PEEK), polyether ketone ketone (PEKK), polyether ether ketone ketone (PEEKK), polyether ketone ether ketone ketone (PEKEKK) and polyacrylic ether ketone (PEAK).

In the present graft polymerization method, a vinyl compound, for example, (meth)acrylate compound can be used as the monomer (ii). Although the monomer generally has a free radical reactivity, it may have the other reactivity, for example, an ionic reactivity (a cationic reactivity or an anionic reactivity).

The (meth)acrylate compound can be polymerized independently or copolymerized in combination of a plurality of compounds, in the present graft polymerization method. It is capable of producing the polymerization product, for example, a copolymer of a (meth)acrylate compound and a maleimide compound, by using a mixture with a vinyl compound or a maleimide compound, depending on the necessity.

The monomer (ii) includes, for example, (meth)acrylic acid; an alkyl(meth)acrylate, such as methyl(meth)acrylate, ethyl(meth)acrylate, n-propyl(meth)acrylate, isopropyl (meth)acrylate, n-butyl(meth)acrylate, isobutyl(meth)acrylic acid, tert-butyl(meth)acrylate, n-pentyl(meth)acrylate, n-hexyl(meth)acrylate, cyclohexyl(meth)acrylate, n-heptyl (meth)acrylate, n-octyl(meth)acrylate, 2-ethylhexyl(meth) acrylate, nonyl(meth)acrylate, decyl(meth)acrylate, dodecyl (meth)acrylate, and stearyl(meth)acrylate; phenyl(meth) acrylate, tolyl(meth)acrylate, benzyl(meth)acrylate; (meth) acrylate alkoxy ester such as 2-methoxyethyl(meth)acrylate and 3-methoxybutyl(meth)acrylate; 2-hydroxyethyl(meth) acrylate and 2-hydroxypropyl(meth)acrylate; glycidyl(meth) acrylate; (meth)acrylates including 2-aminoethyl(meth)acrylate and a silane compound such as gamma-methacryloxypropyltrimethoxysilane; ethylene oxide adducts of (meth)acrylic acid; (meth)acrylate esters containing fluorine atom, such as trifluoromethylmethyl(meth)acrylate, 2-trifluoromethylethyl(meth)acrylate, containing; 2-perfluoroethylethyl(meth)acrylate, 2-perfluoroethyl-2-perfluorobutylethyl(meth)acrylate, 2-perfluoroethyl(meth) acrylate, perfluoromethyl(meth)acrylate, diperfluoromethylmethyl(meth)acrylate, 2-perfluoromethyl-2-perfluoroethylmethyl(meth)acrylate, 2-perfluorohexylethyl (meth)acrylate, 2-perfluorodecylethyl(meth)acrylate, and 2-perfluorohexadecylethyl(meth)acrylate. It is preferable that the monomer (ii) especially contains a compound having a phosphorylcholine group, that is, a vinyl compound having a phosphorylcholine group. Examples of the compounds having a phosphorylcholine group (for example, a (meth)acrylate having a phosphorylcholine group and a styrene compound having a phosphorylcholine group) include 2-methacryloyloxyethyl phosphorylcholine, 2-acryloyloxyethyl phosphorylcholine, 4-methacryloyloxybutyl phosphorylcholine, 6-methacryloyloxyhexyl phosphorylcholine, omega-methacryloyloxyethylene phosphorylcholine, and 4-styryloxybutyl phosphorylcholine. Particularly, the compounds having a phosphorylcholine group includes 2-methacryloyloxyethyl phosphorylcholine (referred to as MPC). 2-Methacryloyloxyethyl phosphorylcholine (MPC) is particularly preferable.

The used amount of the reaction system containing the monomer (the total used amount of the monomer and the solvent) is from 0.01 mL to 10 mL, preferably, for example, from 0.01 mL to 5 mL per 1 $cm^2$ of surface area of the polymer substrate. The monomer concentration (based on the total amount of the monomer and the solvent) is preferably from 0.25 mol/L to 1.00 mol/L, more preferably from 0.25 mol/L to 0.50 mol/L.

In the case where the compound having a phosphorylcholine group is 2-methacryloyloxyethyl phosphorylcholine (MPC), the polymerization product may have a structure which is similar to that of a biomembrane. Therefore, the material comprising a predetermined polymer substrate, which has a coating that coats the surface of the substrate at an intended part with such a polymerization product that have been formed by graft polymerization, is useful as a biomaterial that is used for producing prosthesis or implanting in a living body.

A schematic diagram of the reaction in which PEEK is used as the substrate and 2-methacryloyloxyethyl phosphorylcholine (MPC) is used as the compound having a phosphorylcholine group is shown below.

merely referred to as "UV ray"), which preferably has a wavelength in a range from 200 nm to 450 nm, more preferably has a wavelength in the range from 200 nm to 450 nm. The intensity of light is preferably in a range from 1.5 mW/cm$^2$ to 8.0 mW/cm$^2$, for example, in a range from 4.0 mW/cm$^2$ to 6.0 mW/cm$^2$. The irradiation time is preferably in a range from 20 minutes to 180 minutes and more preferably

[Chemical Formula 2]

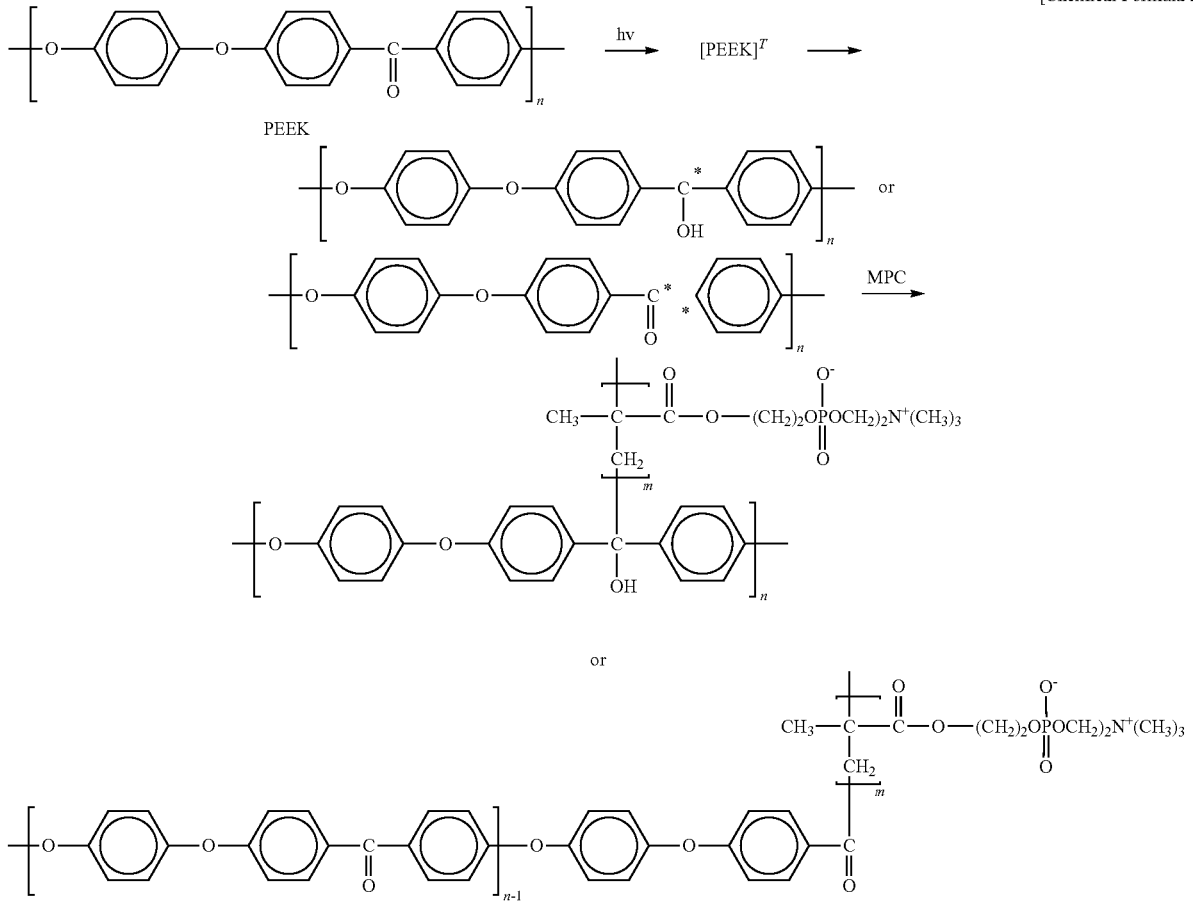

in a range from 45 minutes to 90 minutes. The present photograft polymerization can be suitably performed according to the above conditions.

In the graft polymerization method, examples of the solvent include, for example, water, an alcohol (such as a mono- to tetra-hydric alcohol having 1 to 30 carbon atoms), esters made from an acid such as aliphatic acid (having 2 to 30 carbon atoms) and an alcohol such as an aliphatic alcohol (having 1 to 30 carbon atoms), ketones (for example, having 2 to 30 carbon atoms) (such as a ketone having a ketone group between two aliphatic groups), and mixtures thereof. The suitable solvent includes water and alcohols (such as a mono-hydric aliphatic alcohol having 1 to 30 carbon atoms) and an aqueous solution of these alcohols (wherein the concentration of the alcohol in the aqueous alcohol solution may be from 1 to 99% by weight). The solvent to be used is required to satisfy the conditions that at least monomers are dissolved or dispersed in the solvent; the substrate is neither eroded nor dissolved by the solvent; and the present graft polymerization will not be adversely affected by the solvent.

In the graft polymerization method, free radicals are generated by irradiating the intended surface of the polymer substrate with light energy when the graft polymerization reaction is performed. Compared with the case using a radiation, it is easy to control the range of irradiation in the case using light. Therefore, it is possible to limit and select the area, where the graft polymerization is performed, to an intended part of the surface of the polymer substrate by using a mask and the like.

The polymerization product formed on the surface of the polymer substrate by the present graft polymerization method generally has a thickness from 10 nm to 1 micrometer. For example, it is preferable to have a thickness from 50 nm to 200 nm.

The light that can be used in the present graft polymerization method is an ultraviolet or a visible ray (hereinafter, also The ratio of the amount of the monomer to be used to the polymer substrate can be determined by calculating the amount of the number of moles or the weight of the monomers that corresponds to the thickness of the coating of the polymerization product intended to be formed, to the surface area of the polymer substrate to which the polymerization product intended to be attached. For example, it is capable of using an amount of from about 0.0001 mol to about 1.0 mol of the monomers per 1 cm² of surface area of the polymer substrate.

Furthermore, the graft density (chains/nm²) can be adjusted according to the conditions used in the polymerization. In the present invention, the graft density is preferably in the range from 0.01 chains/nm² to 0.6 chains/nm², particularly in the range from 0.05 chains/nm² to 0.6 chains/nm².

EXAMPLES

Example 1

Hereinafter, the method of performing the graft polymerization without using a polymerization initiator will be explained.

In Example 1, polyether ether ketone (PEEK) was used as the substrate, 2-methacryloyloxyethyl phosphorylcholine (MPC) was used as the monomer and water was used as the solvent for suspending the monomers.

First, the PEEK sample (length 10 cm×width 1 cm×thickness 0.3 cm; weight 3.9 g: trade name 450G manufactured by VICTREX) used as the substrate was ultrasonically cleaned in ethanol, thereby the surface was cleaned. Separately, 0.5 mol/L aqueous solution of MPC was prepared. The above-prepared aqueous MPC solution was introduced into a quartz glass vessel in an amount of 15 mL.

While maintaining the temperature of the above aqueous MPC solution at 60° C., the PEEK sample was immersed in the aqueous MPC solution. The PEEK sample was irradiated with ultraviolet rays having a wavelength of 300 to 400 nm at an intensity of 5 mW/cm² for 90 minutes, thereby performed the graft polymerization reaction. After irradiating with ultraviolet rays, the PEEK sample was picked up from the aqueous MPC solution, sufficiently rinsed with pure water and dried.

Example 2

In Example 2, the same procedure as Example 1 was performed except that carbon fiber PEEK composite (CF-PEEK) sample (length 10 cm×width 1 cm×thickness 0.3 cm; weight 4.2 g: trade name CK4600 manufactured by Sumitomo Chemical Co., Ltd.) was used as the substrate.

Comparative Example 1

In order to compare with Example 1, Comparative Example 1 was performed. In Comparative Example 1, the same procedure as in Example 1 was performed except that a polyethylene (PE) sample (length 10 cm×width 1 cm×thickness 0.3 cm; weight 2.6 g: trade name GUR1020 manufactured by POLY HI SOLIDUR) was used as the substrate.

Comparative Example 2

In Comparative Example 2, benzophenone (BP) was added as the polymerization initiator to the reaction system of Example 1. First, BP was dissolved in an acetone solution so that the concentration of BP was 10 g/L. After immersing the PEEK sample used as the substrate in the obtained BP/acetone solution for 30 seconds, the PEEK sample was picked up from the solution and dried, to give a PEEK substrate having the surface coated with BP. Using this substrate, the graft polymerization reaction was performed in the same manner as in the method of Example 1. The difference from Example 1 was the procedure that BP was applied onto the surface of substrate before the graft polymerization reaction.

Comparative Example 3

In Comparative Example 3, BP was used as the polymerization initiator in the reaction system of Comparative Example 1. First, BP was dissolved in an acetone solution so that the concentration of BP was 10 g/L. After immersing the PE sample used as the substrate in the obtained BP/acetone solution for 30 seconds, the PE sample was picked up therefrom and dried, to give a PE substrate having surface coated with BP. Using this substrate, the graft polymerization reaction was performed in the same manner as in the method of Example 1.

Comparative Example 4

In Comparative Example 4, BP was used as the polymerization initiator in the reaction system of Comparative Example 2. First, BP was dissolved in an acetone solution so that the concentration of BP was 10 g/L. After immersing the CF-PEEK sample used as the substrate in the obtained BP/acetone solution for 30 seconds, the CF-PEEK sample was picked up therefrom and dried, to give a CF-PEEK substrate having surface coated with BP. Using this substrate, the graft polymerization reaction was performed in the same manner as in the method of Example 1.

Each of the products from Example 1 and Comparative Example 2 was subjected to Fourier transform infrared spectroscopy (FT-IR) analysis with total reflection method (ZnSe prism) by using FT-IR analyzer Type 615 (manufactured by JASCO Co. Ltd.) at a resolution of 4 cm$^{-1}$ for 32 times of integration. The results are shown in FIG. 1.

From FIG. 1a, it has been confirmed that each PEEK in products obtained in Example 1 and Comparative Example 2 has not been deteriorated through each operation. From FIG. 1b, the peaks (1060 and 1720 cm$^{-1}$) derived from MPC were found on the surface of the PEEK used in the graft polymerization without using the photopolymerization initiator (benzophenone). Therefore, it was confirmed that MPC could be graft polymerized onto the surface of the PEEK in the present invention, wherein the photopolymerization initiator was not used.

Figure 2:
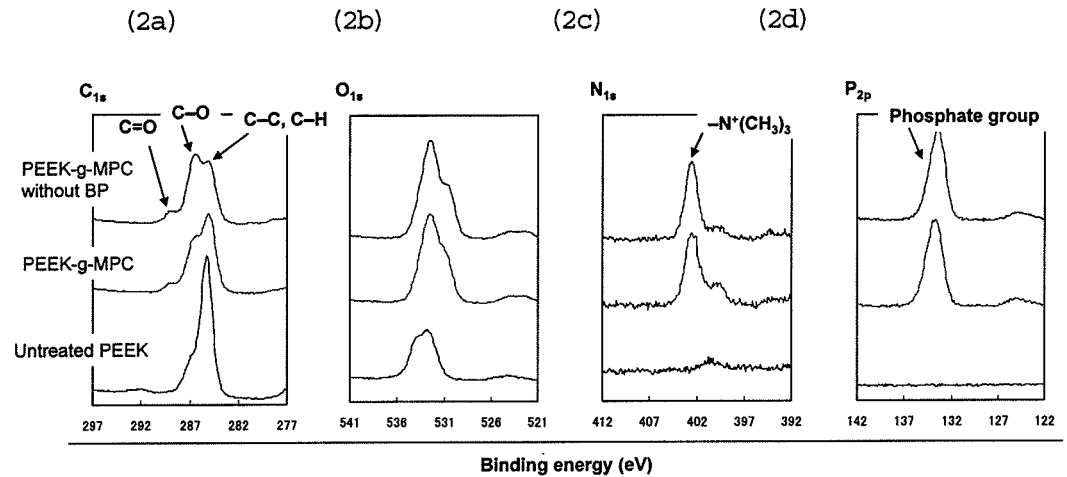
FIG. 2 shows the results of the XPS analysis (spectrum) of the products of Example 1 and Comparative Example 2.

Each of the products from Example 1 and Comparative Example 2 was subjected to XPS analysis using an XPS spectrometer (AXIS-HSi 165 manufactured by KRATOS ANALYTICAL) equipped with a Mg—Kα X ray source under the measurement conditions using applied voltage of 15 kV and photoelectron emission angle of 90 degrees. The results of the obtained spectral analysis are shown in FIG. 2. In addition, the results of the surface elemental composition are shown in Table 1.

From FIG. 2a, the peak (C=O) derived from MPC was found in any of the PEEK surface that was subjected to the graft polymerization with using the photopolymerization initiator (benzophenone) and the PEEK surface that was subjected to the graft polymerization without using the photopolymerization initiator. Therefore, it could be confirmed that MPC also could be graft polymerized on the surface of the PEEK in the present invention, wherein the photopolymerization initiator was not used.

From FIG. 2c, the peak (—N$^+$(CH$_3$)$_3$) derived from MPC was found in any of the PEEK surface that was subjected to the graft polymerization with using the photopolymerization initiator (benzophenone) and the PEEK surface that was subjected to the graft polymerization without using the photopolymerization initiator. Therefore, it could be confirmed that MPC also could be graft polymerized on the surface of the PEEK in the present invention, wherein the photopolymerization initiator was not used.

From FIG. 2d, the peak (P—O) derived from MPC was found in any of the PEEK surface that was subjected to the graft polymerization with using the photopolymerization initiator (benzophenone) and the PEEK surface that was subjected to the graft polymerization without using the photopolymerization initiator. Therefore, it could be confirmed that MPC also could be graft polymerized on the surface of the PEEK in the present invention, wherein the photopolymerization initiator was not used.

In each of $N_{1s}$ spectrum and $P_{2p}$ spectrum, the peak derived from MPC was found in the graft polymerized PEEK surface irrespective of the presence or absence of the photopolymerization initiator.

TABLE 1

XPS Analysis (Atomic Concentration)
(n = 5)

| | Sample | Surface elemental composition (atom %) | | | |
|---|---|---|---|---|---|
| | | $C_{1s}$ | $O_{1s}$ | $N_{1s}$ | $P_{2p}$ |
| | PEEK (untreated) | 83.2 (0.5)** | 16.7 (0.5) | 0.1 (0.1) | 0.0 (0.0) |
| Com. Ex. 2 | PEEK-g-MPC | 64.5 (1.1) | 25.2 (0.8) | 5.1 (0.2) | 5.2 (0.2) |
| Example 1 | PEEK-g-MPC without BP | 62.5 (0.6) | 27.3 (0.5) | 5.1 (0.1) | 5.1 (0.1) |
| | MPC polymer* | 57.9 | 31.6 | 5.3 | 5.3 |

*Theoretical elemental composition of MPC polymer.
**The standard deviation is in parentheses.

It was confirmed from Table 1 that, with regard to the atomic concentration on the surface of the product obtained by the graft polymerization of MPC onto PEEK, the atomic concentration on the surface of the product obtained from Example 1 wherein no photopolymerization initiator was used is substantially equivalent to that of the product obtained from Comparative Example 2 wherein photopolymerization initiator was used. In addition, nitrogen and phosphorus are the elements derived from MPC and it is shown that each atomic concentration of nitrogen and phosphorus in each product of Example 1 and Comparative Example 2 is substantially equivalent to that of the theoretical value of MPC copolymer.

Each static water contact angle of the products of Examples 1 and 2 and Comparative Examples 1-4 was measured by an surface contact angle goniometer (model DM300 manufactured by Kyowa Interface Science Co., Ltd.) using a sessile drop method according to ISO Standard 15989 under the conditions in which drops of purified water (1 μL) were deposited on each surface of the products and the contact angle was measured at 60 seconds after deposition. As a basis for comparison, the static water contact angle was similarly measured in the untreated state with regard to each polymer substrate used in Examples 1 and 2 and Comparative Example 1. The results are shown in FIG. 3.

Figure 3:
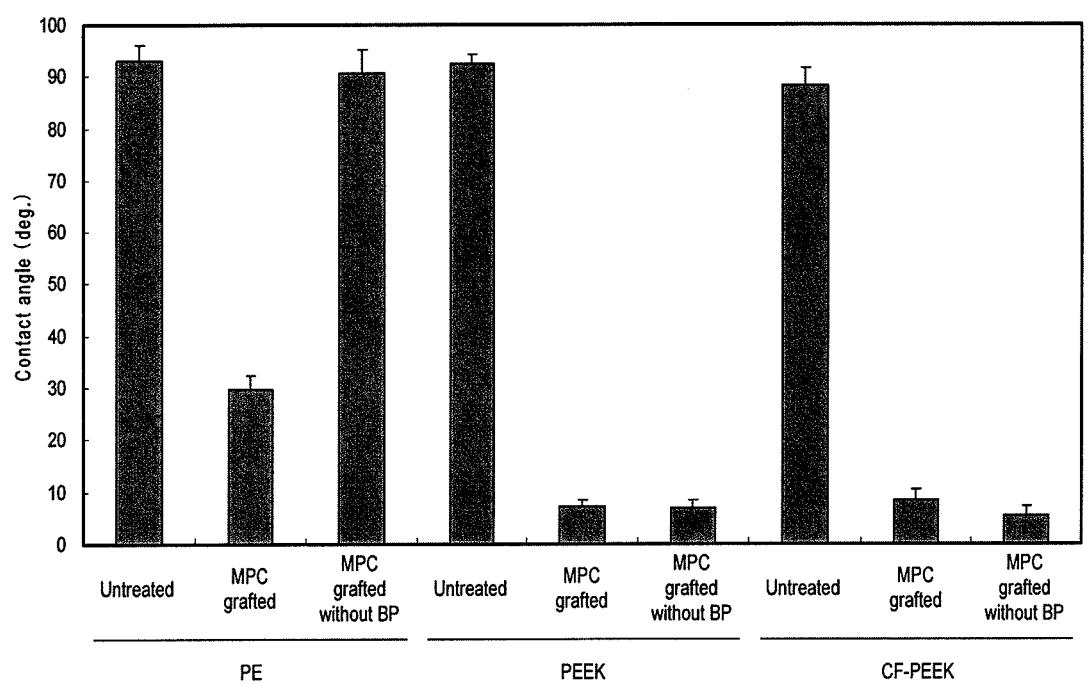
FIG. 3 shows the results of water static contact angle on the un-treated substrate and the treated substrates with/without using the polymerization initiator, using PE substrate, PEEK substrate and CF-PEEK substrate.

It was confirmed from FIG. 3 that the water contact angle on the surface of the product significantly decreased irrespective of the presence or absence of the photopolymerization initiator with regard to each product obtained from Example 1 and Comparative Example 2, which was obtained by the graft polymerization of MPC onto PEEK substrate.

According to the results from Comparative Examples 1 and 3, wherein PE was used as the substrate, the contact angle value of the product from Comparative Example 1, which was obtained by performing the graft polymerization of the MPC to PE substrate without using the photopolymerization initiator was larger than that of the product from Comparative Example 3, which was obtained by performing the graft polymerization of the MPC to PE substrate with using the photopolymerization initiator, and was rather similar to the contact angle value of the untreated PE substrate. From this, it has been shown that the substrate which has no ketone group on the surface of the substrate could not be applicable to the graft polymerization of a monomer to the substrate without using a photopolymerization initiator, and thus is outside the scope of the present invention.

INDUSTRIAL APPLICABILITY

It is possible to form a functional membrane or a coating layer having the desired properties on the surface of various polymer substrates according to the graft polymerization method of the present invention. It is possible to form functional materials such as a plastic molded material, a plastic film material, a photo lens material, a medical material, and a magnetic material by appropriately selecting and combining the polymer substrate and the monomer.

The invention claimed is:

1. A method of surface-initiated graft polymerization comprising:
    immersing a polymer substrate (i) having a ketone group on the surface of the substrate in a reaction system containing a monomer (ii); and
    irradiating the polymer substrate (i) with light which is an ultraviolet ray or visible ray, thereby initiating a polymerization reaction of the monomer from the surface of the polymer substrate (i) to give a polymerization product.

2. The method according to claim 1, wherein a polymerization initiator is absent at the surface and inside of the polymer substrate (i) and in the reaction system containing the monomer (ii).

3. The method according to claim 1, wherein the reaction system containing the monomer (ii) further contains a solvent in which the monomer (ii) is dispersible or dissolvable without dissolving the polymer substrate (i).

4. The method according to claim 1, wherein the polymer substrate (i) is a polymer substrate comprising an aromatic ketone.

5. The method according to claim 1, wherein the polymer substrate is selected from the group consisting of polyether ketone (PEK), polyether ether ketone (PEEK), polyether ketone ketone (PEKK), polyether ether ketone ketone (PEEKK), polyether ketone ether ketone ketone (PEKEKK) and polyacrylic ether ketone (PEAK).

6. The method according to claim 1, wherein the monomer (ii) is selected from (meth)acrylate compounds.

7. The method according to claim 1, wherein the monomer (ii) is at least a compound selected from the group consisting of epoxy(meth)acrylate compounds, urethane(meth)acrylate compounds, polyester(meth)acrylate compounds, polybutadiene(meth)acrylate compounds and silicone (meth)acrylate compounds.

8. The method according to claim 1, wherein the monomer (ii) contains a compound having a phosphorylcholine group.

9. The method according to claim 8, wherein the compound having a phosphorylcholine group is 2-methacryloyloxyethyl phosphorylcholine (MPC).

10. The method according to claim 1, wherein the irradiated light has a wavelength in the range from 200 to 450 nm.

11. The method according to claim 1, wherein the irradiated light has a wavelength in the range from 300 to 400 nm.

12. The method according to claim 1, wherein the light has a wavelength in a range from 200 nm to 450 nm.

* * * * *